United States Patent Office 3,248,649
Patented Apr. 26, 1966

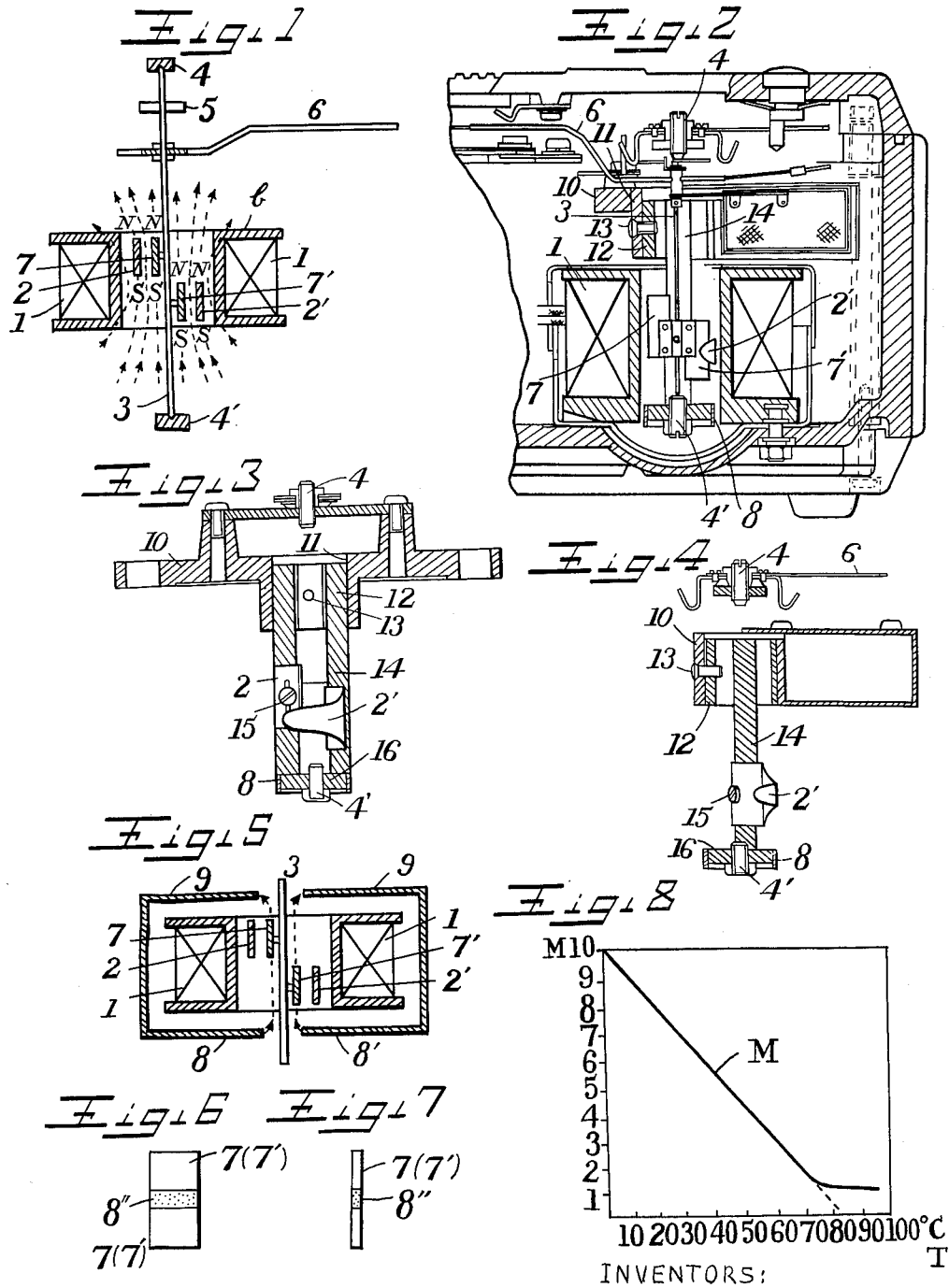

3,248,649
REPULSION-ATTRACTION TYPE MOVABLE IRON VANE METER INCLUDING TEMPERATURE RESPONSIVE FLUX FIELD VARYING MEANS
Miyaji Tomota, Kiyoshi Seki, and Kenzo Sasaoka, Tokyo, Japan, assignors to Kabushikikaisha Yokogawa Denki Seisakusho (Yokogawa Electric Works Ltd.), Tokyo, Japan, a corporation of Japan
Filed July 11, 1961, Ser. No. 123,141
3 Claims. (Cl. 324—105)

This invention relates to a movable iron type electric meter, and more particularly to a movable iron type electric meter in which an error due to temperature change can effectively be compensated.

One object of this invention is to provide a movable iron type electric meter in which reading deviations due to temperature changes can be minimized with a simple structure.

Another object of this invention is to provide a movable iron type electric meter having a magnetic body which will effectively compensate for a change of torque in a controlling spring mounted on a rotary shaft of the meter which is caused by temperature changes.

Still another object of this invention is to provide a movable iron type electric meter in which a reading error due to temperature change may be avoided when main parts of the meter including an energizing coil are shielded from an external magnetic field with a case made of magnetic material.

Other objects, features and advantages of this invention will be fully apparent from the following description taken in connection with the accompanying drawings in which, FIGURE 1 is a longitudinal sectional view diagrammatically illustrating the main parts of a conventional movable iron type electric meter;

FIGURE 2 is a sectional view of a movable iron type electric meter illustrating one embodiment of this invention;

FIGURE 3 is a longitudinal sectional view of the main parts of the meter shown in FIG. 2;

FIGURE 4 is a sectional view of the meter part shown in FIG. 3;

FIGURE 5 is a schematic sectional view illustrating another embodiment of this invention;

FIGURE 6 is an enlarged front view of a movable iron piece employed in the electric meter of the present invention;

FIGURE 7 is a side view of the iron piece shown in FIG. 6; and

FIGURE 8 is a curve illustrating the variation in permeability of a temperature responsive iron piece as effected by temperature changes.

A prior art movable iron type electric meter, as for example a repulsion-attraction type meter is shown in FIG. 1. 1 is an energizing coil through which a current to be measured passes, and 2 and 2' are respectively stationary iron pieces fixed within the coil 1. 3 is a rotary shaft supported by both upper and lower bearings 4 and 4'. On shaft 3 are mounted a controlling spring 5, a pointer 6, and movable iron pieces 7 and 7'. The movable iron pieces 7 and 7' are arranged respectively, opposite to the stationary iron pieces 2 and 2' with desired distances. The controlling spring 5 is arranged between the shaft 3 and a stationary part. When a current to be measured, for instance an alternating current, flows into the energizing coil 1, an alternating magnetic flux Φ is established around the coil 1 as shown by the broken lines in FIGURE 1. This magnetic flux magnetizes the stationary iron pieces 2 and 2' and the movable iron pieces 7 and 7' all in the same polarity. Between the movable and stationary iron pieces 2-7 and between 2'-7' which are arranged oppositely to one another, repulsion forces are caused. However, if the deflection of the movable iron pieces 7 and 7' goes beyond a certain value, attraction forces are established between the movable iron piece 7' and the other stationary iron piece 2 and between stationary iron piece 2' and movable iron piece 7, which forces act as a torque to rotate the shaft 3. The torque is of such a magnitude as determined by the value of current to be measured. The pointer 6 which is mounted on the shaft 3 comes to a standstill at a position where the above torque and the controlling torque of the controlling spring 5 come to balance. Thus, the value of the current to be measured can be read from the indication of the pointer 6. In this type of meter, the controlling torque of the controlling spring is weakened by self heating of the meter or ambient temperature rise; consequently, the pointer deviates from a correct scale position and an indication error is caused.

The present invention is intended to overcome the above error due to temperature change in a movable iron type electric meter, by disposing therein a magnetic body which reduces its permeability in accordance with temperature rise in the magnetic field generated by the current to be measured.

FIG. 2 is a longitudinal sectional view illustrating one embodiment of a movable iron type electric meter according to the present invention, wherein parts corresponding to those in FIG. 1 are designated by the same numerals. In the present invention, the magnetic body which reduces its permeability in accordance with temperature rise is arranged in the path of magnetic flux as above described. In this embodiment an annular magnetic body 8 is placed in the magnetic field generated by the current to be measured. To this end (see also FIGS. 3, 4), a stationary-ironpiece supporting member, which comprises a cylinder shaped upper part 12 and a paralleled-bar shaped middle part 14, and a disc shaped lower part 16, is fitted into central aperture 11 of a main frame 10 with a screw 13. On the paralleled-bar part 14, two stationary iron pieces 2 and 2' are mounted with screws 15, and on the periphery of the disc part 16, an annular magnetic body 8 for temperature compensation is secured by adhesives. Furthermore, through the cylinder part 12 (FIG. 2), a rotary shaft 3 to which two movable iron pieces 7 and 7' are mounted is supported pivotably between upper and lower bearings 4 and 4', the lower bearings 4' being screwed into the disc part 16. For the magnetic body 8 for compensating temperature, alloys having permeability which is variable with temperature change may be employed, as for example, copper-nickel alloy or iron-nickel alloy. An example of the permeability characteristics of the iron-nickel alloy is shown by a curve M in FIG. 8. If such material is arranged in the path of the above described magnetic flux, the magnetic reluctance of the magnetic body 8 increases with the temperature rise in the meter, hence the magnetic flux passing through the magnetic body 8 and thus the torque of the meter are decreased so as to be balanced with the weakened controlling torque of the aforesaid controlling spring. Accordingly, the magnetic body 8 can compensate the reading error due to changes of the controlling torque of the controlling spring 5, which will occur with the temperature change, and the pointer 6 indicates a correct scale reading without being affected by temperature.

In the above description 5, is referred to as a controlling spring mounted onto the rotary shaft 3 and controlling the torque, but it may be a suspension band pulling the movable iron pieces upward and downward. In short, when the controlling means change its controlling torque with temperature change, the above described effect will equally be obtained. The torque is produced by both the movable and stationary iron pieces in the above description, but the same result is also given when the torque will be generated by the movable iron pieces only.

FIG. 5 illustrates another embodiment of this invention wherein 9 is a shielding case for shielding the internal elements of the meter from an external magnetic field and serving as a path of the above magnetic flux at the same time. 8' is a magnetic plate connected with one part of the shield case. This magnetic plate 8' is made of a material of the same characteristic as that of the magnetic body 8 in FIG. 2. The shielding case 9 may be wholly composed of a magnetic material having the compensating character. In such cases, the magnetic flux passing through the shielding case is controlled by temperature and the same effect as in the example shown in FIG. 2 may be obtained.

FIGS. 6 and 7 show a modified form of the compensating magnetic material to be applied to the movable iron pieces or stationary iron pieces, wherein the movable iron pieces 7 (7') and a magnetic body 8" are formed integrally. The magnetic body 8" is made of the same material as that of the magnetic body 8 in FIG. 2. In this embodiment the magnetic body 8" is positioned in the middle of the movable iron piece 7 (7'), but it may also be placed at the upper or lower part of the piece 7.

According to this invention as above described, the movable iron type electric meter having a complete temperature compensation feature, may thus be realized in a simple construction.

It will be apparent that many modifications and variations may be effected without departing from the scope of the inventive concept of the present invention.

What is claimed is:

1. A repulsion-attraction movable iron type electric meter comprising a rotary shaft, a coil arranged around said shaft, means supplying an electric current to said coil for establishing a magnetic field around said shaft, a movable iron piece mounted on said shaft, a stationary iron piece supported in the magnetic field established by said coil and in a location opposite said movable iron piece, a pointer mounted on said shaft at one end, a controlling spring supported on said rotary shaft and engaging a stationary part of the meter and tending to restrain rotation of said shaft, and an annular magnetic body extending concentrically around the other end of said shaft and located in the magnetic field, said magnetic body having its permeability reduced when subjected to a temperature rise whereby it diminishes the strength of the magnetic field for compensating the reading error due to a change in the controlling force of said controlling spring occurring with temperature change.

2. A repulsion-attraction movable iron type electric meter comprising a rotary shaft, a coil arranged around said shaft, means supplying an electric current to said coil for establishing a magnetic field around said shaft, a movable iron piece mounted on said shaft, a stationary iron piece supported in the magnetic field established by said coil and in a location opposite said movable iron piece, a pointer mounted on said shaft at one end, a controlling spring supported on said rotary shaft and engaging a stationary part of the meter and tending to restrain rotation of said shaft, a casing enclosing said coil, said movable iron piece, and said stationary iron piece and acting to shield them from an external magnetic field, and a magnetic body located in the magnetic field and constituting a part of said casing, said casing and said magnetic body serving as a path for said magnetic field, said magnetic body having its permeability reduced when subjected to a temperature rise whereby it diminishes the strength of the magnetic field for compensating the reading error due to a change in the controlling force of said controlling spring occurring with temperature change.

3. A movable iron type electric meter in accordance with claim 2 wherein said casing is made of magnetic material which has its permeability reduced when subjected to a temperature rise.

References Cited by the Examiner

UNITED STATES PATENTS

| | | | |
|---|---|---|---|
| 1,667,624 | 4/1928 | Corson | 324—105 |
| 1,847,251 | 3/1932 | McKinley | 324—105 |
| 2,298,412 | 10/1942 | Remde | 324—147 |
| 2,371,299 | 3/1945 | Johnson | 324—105 |
| 2,513,900 | 7/1950 | Thomander | 324—105 |
| 2,572,639 | 10/1951 | Lovegrove | 324—105 |
| 2,610,989 | 9/1952 | Wiese | 324—147 |

WALTER L. CARLSON, *Primary Examiner.*